United States Patent [19]

Hart

[11] 3,957,731
[45] May 18, 1976

[54] STORAGE-STABLE BUTYLATED UREA-FORMALDEHYDE CROSS-LINKING AGENT AND PROCESS FOR THE MANUFACTURE THEREOF

[75] Inventor: William Frederick Hart, Darien, Conn.

[73] Assignee: American Cyanamid Company, Stamford, Conn.

[22] Filed: Mar. 25, 1975

[21] Appl. No.: 561,752

[52] U.S. Cl. ............................ 260/70 A; 260/33.6 R
[51] Int. Cl.² .................................................. C08G 14/02
[58] Field of Search ..................... 260/70 A, 33.6 R

[56] References Cited
UNITED STATES PATENTS

| | | | |
|---|---|---|---|
| 2,326,265 | 8/1943 | Tawney | 260/70 A |
| 2,544,351 | 3/1951 | Parker | 260/70 A |
| 2,600,100 | 6/1952 | Evans et al. | 260/70 A X |
| 3,392,150 | 7/1968 | Groll | 260/70 A X |

Primary Examiner—Murray Tillman
Assistant Examiner—W. C. Danison, Jr.
Attorney, Agent, or Firm—James T. Dunn

[57] ABSTRACT

Urea-formaldehyde-butanol condensation products are storage-stable and substantially non-self-condensing at room temperature when they have a weight average molecular weight less than 1,000 and consist essentially of urea units carrying on the average 0.2 to 0.6 aldehyde reactive H atoms, 0.6 to 1.0 formaldehyde bridge, 1.2 to 1.8 $C_4H_9OCH_2$— substituent and 0 to 0.2 —$CH_2OH$ substituent per urea unit therein. They are made by reacting urea with 2.5 to 3 mols of $CH_2O$ in aqueous alkaline solution, and then reacting the product with 1.2 to 1.8 mols of butanol in the presence of an acid etherification catalyst with simultaneous vacuum distillation of water.

18 Claims, No Drawings

STORAGE-STABLE BUTYLATED UREA-FORMALDEHYDE CROSS-LINKING AGENT AND PROCESS FOR THE MANUFACTURE THEREOF

FIELD OF THE INVENTION

The present invention relates to a novel storage-and thermo-stable cross-linking agent useful for insolubilizing surface coating resins. The invention includes the cross-linking agent itself, compositions containing the agent, and processes for the manufacture of the agent.

CROSS REFERENCE TO RELATED APPLICATION

U.S. Pat. application Ser. No. 430,802 filed on Jan. 4, 1974, by Leonard J. Calbo, Jr. discloses a condensation product which is specially useful in the surface coating art. The product is of pumpable viscosity at 25°C. even when containing no solvent, and is useful both as a coating resin and as a cross-linking agent. It is composed of inter-reacted urea, formaldehyde and a $C_{4-6}$ alkanol in 1 : 2.3–2.7 : 1.3–1.8 molar ratio respectively, and is a mixture of low molecular weight condensates. It is prepared by inter-reacting the components in the presence of an acid alkylation catalyst (preferably nitric acid), and then neutralizing the catalyst by addition of a base (preferably sodium hydroxide). Its structure is illustrated by the dimer fraction, which has the average approximate structure

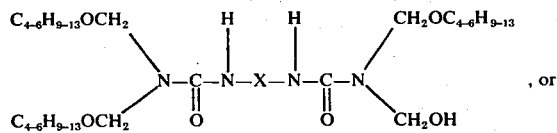

isomeric modifications thereof, wherein X represents a formaldehyde bridge, e.g., $-CH_2-$, or $-CH_2OCH_2-$.

Most of the salt formed by neutralization of the catalyst precipitates as fast as it is formed, but a small part remains in solution and precipitates as the solution ages. The salt precipitates as fine crystals of almost pigmentary dimensions.

The product of the process of said application possesses a number of disadvantages.

The first is that the salt must be removed; otherwise the resin will not produce a film of maximum gloss. Unless removed, the crystals act as pigment and impart a matte surface to the films. While it is possible to remove the crystals by filtration, filtration is a significant item of expense and moreover does not permanently remedy the difficulty since a part of the salt remains in solution and slowly precipitates as the resin ages, forming fresh deposits of crystals.

A second disadvantage is that the resin is not wholly compatible with epoxy vehicles, perhaps because of the salt crystals or the residual salt in solution.

A further disadvantage is that the resin is selfreactive at baking temperatures even in the absence of acid catalyst. Thus, when the resin is employed as cross-linking agent, the resin tends to react with itself, so that not all of the resin performs its cross-linking function. As a result, either the resin must be employed in theoretical excess, or a less cross-linked (and so a softer or less solvent-resistant) film is obtained.

PRIOR PATENT

Tawney U.S. Pat. No. 2,326,265 is directed at producing urea-formaldehyde-butanol resins for use in coating compositions, e.g., with oil-modified alkyl types of resins. However, the resin is produced as a 50%–60% solution in a volatile solvent, and so evidently is not of pumpable viscosity at about 100% solids.

SUMMARY OF THE INVENTION

The discovery has now been made that the butylated urea-formaldehyde resin which consists essentially of urea ($=N-CO-N=$) units which on the average carry 0.2 to 0.6 aldehyde-reactive hydrogen atom per unit, which has an average content between about:

0.6 to 1 methylene ($-CH_2-$ or $-CH_2OCH_2-$) bridge, 1.2 to 1.8 butoxymethyl ($-CH_2OC_4H_9$) substituent, and 0 to 0.2 methylol ($-CH_2OH$) substituent per urea substituent therein and which has a molecular weight between 400 and 1,000 is substantially free from the abovementioned disadvantages. I have found that resins of this description are of pumpable viscosity at about 100% solids at room temperature, and that the resin is only very slowly reactive with itself at temperatures up to 55°C. (even in the presence of an acid catalyst) or with most coating vehicles.

I have also found that despite this comparative stability at room and moderately elevated temperatures, the resin cross-links rapidly at acid pH with most cross-linkable thermosettable coating components when heated in the temperature usually employed for baking (i.e., thermosetting) compositions of this type.

I have found that the herein-disclosed resin (hereinafter sometimes termed "cross-linking agent") can be blended with cross-linkable surface-coating resins and an acid condensation catalyst (preferably a latent acid condensation catalyst) to provide ready-to-apply thermosetting coating compositions which have a long shelf life at ordinary storage temperatures. As a further result, single-package coating compositions (containing a coating vehicle, cross-linking agent and latent catalyst) prepared by a centrally-located manufacturer and shipped to consumers and stored, is stable for as long as a month at 55°C. without significant cross-linking of the coating components, as evidenced by little increase in viscosity.

DETAILED DESCRIPTION

The resin is composed of a mixture of urea, formaldehyde and butanol reaction products in the range from monomeric to hexameric or larger, said mers being present in such proportion that the resin has a weight average molecular weight of less than about 1,000 (corresponding to an average molecular size of pentameric). Preferably the resin has a weight average molecular weight in the range of 600 – 900, as in this range the molecular weight of the resin is sufficiently large that it does not crystallize on standing and thermosets rapidly, yet is sufficiently low that it is of pourable viscosity and of commercially adequate stability.

The structural formula of the agent of the present invention has not been determined, but it has been found that the agent is a complex mixture of polymers, some of which may be in partially condensed and in isomeric form. However, theory indicates that components of the pentamine fraction may be composed of molecules having the formula:

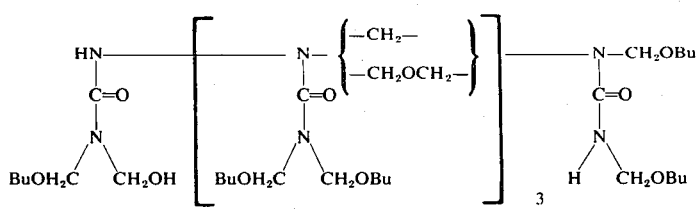

The bracket in the formula shows that the bridges —CH$_2$— and —CH$_2$OCH$_2$— are both possible.

The formula set forth above is presented merely as an aid towards an understanding of the invention and is not to be construed in limitation thereof. However, it indicates that the very low reactivity of the agent of the present invention is ascribable to the low proportion of aldehyde-reactive hydrogen atoms and the methylol groups therein.

The resin of the present application in preferred embodiments possesses the following additional beneficial properties.

1. The agent need have no content of sodium nitrate or similar salt. It is adequately stable when its content of acid condensation catalyst remains unneutralized. The agent thus need not be subjected to a filtration step before use, and does not develop a precipitate on standing.

2. The agent is soluble in (or compatible with) practically all of the volatile solvent and solvent mixtures commonly used in the formulation of surface coatings. The agent thus in most cases does not require a mutual solvent or a coupling agent to produce compatability, and a solvent is necessary only when the coating component is so viscous as to require the presence of a thinner.

3. The agent is soluble in (or compatible with) practically all commercial cross-linkable alkyd and vinyl surface-coating resins, and is reactive with polymers which carry primary and secondary amino, primary amido, carboxyl, and alcoholic hydroxy groups. The agent is thus capable of cross-linking most commercially available coating resins.

4. The cross-linkages imparted by the agent of the present invention are very water- and solvent-resistant.

5. Films prepared by use of the cross-linking agent of the present invention possess excellent flexibility and adhesion to steel even when cured to the point where they possess extreme hardness.

Preferably, the cross-linking agent of the present invention consists essentially of urea units which on the average carry about 0.3 to 0.5 aldehyde-reactive hydrogen atoms per unit and between about:
 0.7 – 0.9 formaldehyde bridge,
 1.4 – 1.6 butoxymethyl substituent and
 0 – 0.2 methylol substituent per urea unit therein,
and has a molecular weight in the range of 600 to 900. In this range the beneficial properties of the resin are maximized without introducing undesirable properties.

The greatly decreased reactivity of the agent of the present invention is ascribable to the low proportion of aldehyde reactive hydrogen atoms and methylol substituents therein. The proportion of these components in the agent is sufficiently low so that the agent is almost inert at room temperature towards coating resins cross-linkable therewith (even in the presence of an acid condensation catalyst), yet the proportion is sufficiently high so that the agent rapidly cross-links with such resins in the presence of an acid catalyst at temperatures within the normal baking range of 250° – 350°F.

I have further found that the cross-linking agent of the present invention can be prepared in conventional apparatus by a process which is simple, rapid and inexpensive.

According to the process 1 mol of urea is reacted with between about 1.8 and 3 mols of formaldehyde in aqueous alkaline solution at condensation temperature whereby an aqueous solution is formed of a mixture of substantially monomeric to trimeric urea-formaldehyde condensates; at least 80% of the free water present is distilled from the solution; at least 2 mols of butanol containing less than 25% and preferably less than 10% by weight of water are added together with an acid etherification catalyst; and the mixture is heated at alkylation temperature (with distillation of water as necessary to render and to maintain the reaction mixture substantially anhydrous) until the reaction mixture contains between about 1.2 and 1.8 butoxymethyl substituents and less than 0.2 methylol substituent per urea unit therein. The mixture then necessarily contains between 0.6 and 1 formaldehyde bridge and between 0.2 and 0.6 aldehyde-reactive hydrogen substituent per urea unit therein, at which point the process is completed.

It is unnecessary to analyze the still residue to determine its content of the above-mentioned substituents, because the end point of the butylation (i.e., the end of reaction) can be determined more conveniently by plotting the viscosity of the reaction product and the solubility of the reaction product in a selected solvent. The end point of the reaction, as a practical matter, is the point at which the viscosity substantially ceases to increase and at which 10 g. of the product (substantially free from butanol or other solvent) dissolves in 75 cc. of ASTM "naphtha" (a mixture of 84% by weight of isooctane, 8% of decahydronaphthalene, and 8% of toluene) at room temperature.

The resulting reaction product is the agent of the present invention. It is a transparent, nearly water-clear, substantially anhydrous syrup of pourable viscosity at room temperature, and may contain substantially no solvent, i.e., less than 5% of butanol by weight, and the acid catalyst in un-neutralized state.

In the first step of the process, the urea is preferably reacted with about 2.5 – 3.0 mols of formaldehyde at a pH between 8 and 9 at a temperature in the range of 50°C. – 100°C. This introduces the preferred proportion of methylol substituents into the urea.

In the first distillation following the urea-formaldehyde reaction, heat is supplied at such rate that the water is removed in accordance with conventional practice. Not all the water need be removed, and in fact better results are obtained when the distillation is stopped when the reaction mixture contains 10% – 20% of water.

Distillation is resumed after the catalyst and the butanol have been added. In this distillation it is advantageous to distil off substantially all the free water present without loss of time, and thereafter distil water about as fast as it is formed, as this accelerates the rate at which the butanol reacts and increases the extent of the butylation. Distillation is continued until the speed of butylation becomes slow. The terminal distillation temperature is about 110° – 130°C. under 25 inches of vacuum.

The distillations are advantageously performed under vacuum (preferably 25 inches of Hg or higher, e.g., 26 inches – 27 inches) as this permits substantially all of the free water to be removed rapidly at a low temperature and over-heating of the reaction mixture (with consequent build-up of molecular weight) is avoided.

The amount of butanol which is added may be any amount, however large. A large excess, however, confers little advantage, and I have found that the preferred amount to add is 3 to 4 mols per urea unit because this amount provides a safe excess (without oversupply) over that needed for the butylation reaction. The preferred butanol is n-butanol since this is widely available and gives excellent results.

The butanol may be added in one or more increments, and even as a stream. It will generally be found more economical to add the butanol in two increments, the first increment being recycled butanol (containing 10% water by weight), the remainder being anhydrous butanol.

Distillation of butanol from the reaction mixture may be terminated when the butylation reaction comes to an end. At this point, water ceases to form. If distillation of butanol is then terminated, the contents of the still probably will have a substantial content of dissolved butanol and will consequently have a very low viscosity. This product may be used in coating formulations which require the presence of butanol as solvent for the coating component. However, most of this butanol can be recovered by vacuum distillation without harm to the product. In practice, distillation is terminated when the resin contains 5% by weight of butanol as it is not practical or economic to decrease the butanol content of the resin much below this percentage, and this amount is far below the maximum permitted by the Clean Air Acts.

If desired, the butylation may be performed in part by the use of aqueous recycled butanol (containing 10% – 20% water by weight). According to this method, the butanol is added in two increments. The first increment is 2 to 4 mols of such aqueous butanol, together with an appropriate amount of a non-volatile strong acid as etherification catalyst. Distillation of butanol is commenced under vacuum and is continued until the reaction mixture is substantially anhydrous, at which point it contains very little free butanol.

The second increment of butanol is then added, amounting to 1 to 3 mols, or more if desired. This butanol may contain water like the first increment, but a superior resin is obtained when the butanol is anhydrous. Distillation is commenced under vacuum and is continued at such rate as to remove the water of reaction substantially as fast as formed, so as to maintain the reaction mixture substantially anhydrous. The size of this increment is preferably such that the reaction mixture contains a substantial amount (e.g., 10%) of free butanol when the reaction ends. If, however, all the butanol should be consumed before the reaction ends, additional butanol should be added. If preferred, the butanol can be added continuously, and in this way the volume of circulating butanol in process can be decreased. The excess butanol can be left in the reaction mixture (in which event it acts as diluent or thinner), or it can be distilled off and reused and this is preferred.

Alternatively, all of the butanol (1 to 3 mols or more) can be added in a single increment. In this modification the butanol should contain less than about 10% water by weight, and preferably should be substantially anhydrous, because when a larger proportion of water is present the molecular weight of the resin on completion of the butylation is too high and the product is of non-pumpable viscosity at 100% solids.

The acid alkylation condensation catalyst is any strong non-volatile acid, for example sulfuric, phosphoric, nitric, trichloroacetic, and p-toluenesulfonic acids. The suitable amount varies from instance to instance and depends on the pK of the acid, its molecular weight and on the number of acid functionalities which it contains. However, a suitable amount in any instance can be determined by laboratory trial, and in most instances good results have been obtained by the use of 1/5% – 1/2% of the acid on the weight of the urea initially taken. A suitable amount in any instance is the minimum amount which causes the butylation to proceed at the rate shown in the examples which follow.

The polymer is conveniently analyzed as follows.

The molecular weight of the polymer is determined as a weight number average by use of a vapor pressure osometer. The urea content of the polymer is determined by nitrogen analysis. From these two values is calculated the average number of urea residues per macromolecule. The number of mols of combined formaldehyde in the polymer is determined by acid hydrolysis from which the urea : $CH_2$ ratio is calculated. The ratio of the number of butoxy groups to the number of mols of combined formaldehyde is determined by nuclear magnetic resonance. The —$CH_2OH$ is determined by iodine ($I_2$) oxidation. The difference between the number of mols of combined formaldehyde minus the number of (butoxymethyl plus methylol) substituents gives the average number of formaldehyde bridges. The number of aldehyde-reactive hydrogen atoms present is calculated from the —NH— : —$CH_2$— ratio (determined by nuclear magnetic resonance).

Surface coating compositions which contain the cross-linking agent of the present invention can be formulated by mixing any of the conventional cross-linkable surface-coating resins with an effective amount of the resin of the present invention as cross-linking agent, together with an appropriate condensation catalyst and a solvent as needed.

Any of the condensation catalysts may be used, for example p-toluenesulfonic acid, chloroacetic acid, and methanesulfonic acid. When the compositions are not to be used immediately it is advantageous to use a latent catalyst (e.g., an ammonium or amine salt of a condensation catalyst).

The invention is more particularly described in the examples which follow. These examples are preferred embodiments of the invention and are not to be regarded as limitations thereto.

DESCRIPTION OF THE PREFERRED EMBODIMENTS

EXAMPLE 1

The following illustrates a cross-linking agent of the present invention prepared by a method wherein the butanol is added in two increments, the first having a substantial dissolved content of water, and the second increment being anhydrous.

To a reaction vessel equipped with heating elements, stirrer, nitrogen gas inlet tube, thermometer, reflux column and take-off condenser with connection to vacuum are added with stirring 189 gallons of 44% aqueous formalin (27.8 mols) adjusted to pH 8.5 with 20% aqueous sodium hydroxide solution, and 420 lb. of urea (7 mols). The mixture is stirred under nitrogen until all the urea has dissolved and is then maintained at 80°C. for one-half hour. The solution is then heated at 60°C. under a vacuum of 27 inches of Hg for 4 hours at such rate that 900 pounds of distillate are removed during that time. The still residue is a syrup of substantially monomeric methylolureas.

There are then added 271 gallons of 80% aqueous n-butanol (21 mols) and 2.3 pounds of strong (70%) nitric acid as condensation catalyst (which decreases the pH of the reaction mixture to about 2 or 3. The mixture is then heated to distillation temperature under a vacuum of 27 inches of Hg until 1,500 pounds of distillate have been removed. The still residue is a substantially anhydrous mixture of partially butylated methylolureas.

There are then added 145 gallons of anhydrous butanol (14 mols) at 30°C. The distillation step is repeated until 1,225 pounds of distillate (aqueous butanol) have been taken off with a final distillation temperature of about 125°C. at which point evolution of volatile matter has come to a virtual halt. The still bottom is the desired product. The product is a transparent, nearly water-clear, substantially anhydrous syrup having an average molecular weight of 700, and a Gardner-Holdt viscosity at 25°C. of 23, and contains about 0.8 methylene bridge, 1.6 n-butoxymethyl substituent, 0.4 amino (—NH—) group and 0.1 methylol substituent per urea unit present therein. It contains less than 2% of free butanol by weight.

The product is insoluble in water but is soluble at least to the extent of 10% by weight in the following organic liquids:

| | |
|---|---|
| Methanol | Butyl acetate |
| Ethanol | 2-Ethoxy ethyl acetate |
| Isopropanol | Benzene |
| n-Butanol | Toluene |
| Isobutanol | Xylene |
| 2-Methoxyethanol | Ethyl benzene |
| 2-Ethoxyethanol | Styrene |
| 2-Butoxyethanol | Turpentine |
| Acetone | Nitromethane |
| Methyl ethyl ketone | 2-Nitropropane |
| Methyl isobutyl ketone | Acetonitrile |
| Cyclohexanone | Dimethyl formamide |
| Diacetone alcohol | Dimethyl sulfoxide |
| Ethyl acetate | Carbon tetrachloride |
| Mineral spirits/butanol | (95:5) |

The resin is compatible with short oil type alkyd resins (alkyd resins having acid numbers in the range of 5 to 10), and with bisphenol A-epoxy resins.

The product is substantially unchanged after storage at 25°C. for two months and does not more than negligibly increase in viscosity when stored at 35°C. for one month.

EXAMPLE 2

The following illustrates the preparation of a cross-linking agent according to the present invention wherein the butanol is added in one increment.

The procedure of Example 1 is repeated through the point at which water is distilled off following completion of the urea-formaldehyde reaction.

There are then added to the reaction mixture 365 gallons (35 mols) of aqueous n-butanol (water content 10% by weight) followed by sufficient trichloroacetic acid to decrease the pH of the mixture to 0.5, after which the volatiles are distilled under a vacuum of 27 inches of Hg to a terminal temperature of 125°C.

Substantially the same resin is obtained.

EXAMPLE 3

The following illustrates the preparation of a polymer according to the present invention by a process wherein all the butanol added is anhydrous, and is added in one increment.

Into a reaction vessel fitted with reflux column and condenser, nitrogen gas inlet tube, stirrer, dropping funnel and connection to vacuum are charged 245 g. of 44% aqueous formalin (3.6 mols) and the pH is adjusted to 8.2 with 50% aqueous sodium hydroxide. A vacuum of 27 inches of Hg is applied and the mixture is heated and distillation is continued until the temperature of the distillate is 63°C., at which point distillation of water becomes very slow. There is then added a solution of about 0.3 g. of 70% aqueous nitric acid in 260 g. (3.5 mol) of anhydrous n-butanol at room temperature. The resulting mixture has a pH of 2.7. A vacuum of 27 inches of Hg is then applied and the mixture is heated to distill off substantially all the free butanol present. Distillation of butanol becomes very slow when the temperature of the distillate passes the 115°C. mark and the reaction mixture is allowed to cool. The distillate is 80% aqueous butanol which on cooling and standing separates into two layers. The upper layer is butanol containing 8% water by weight. The still residue is a water-clear, very fluid syrup which is pumpable at 20°C. and which is pourable when cooled to 0°C. It has a Gardner-Holdt viscosity at 25°C. of $Z_2$, a solids content of 96% and an ASTM naphtha tolerance rating of 500. It is soluble in toluene in all proportions and does not detectably change in viscosity when stored for four weeks at 55°C.

EXAMPLE 4

The method of Example 1 is repeated except that the butanol is isobutanol. Substantially the same reaction product is obtained.

EXAMPLE 5

The method of Example 1 is repeated except that the alkylation catalyst employed is 5.5 g. of toluene sulfonic acid. A similar reaction product is obtained.

EXAMPLE 6

The following illustrates the cross-linking properties of the agent of the present invention in a typical baking enamel.

The coating component of the enamel is prepared by first grinding a mixture of 325 g. of rutile titanium dioxide pigment (OR 650 grade, manufactured by American Cyanamid Co., Wayne, N. J.) with 185 g. of a 55% by weight solution in mineral spirits of a commercial long oil alkyd resin (Rezyl resin 873 sold by Koppers Co., Pittsburgh, Pa.), and adding 309 g. more of the resin thereto. The resulting mixture is then added to a solution of 90 g. of the cross-linking agent of Example 1 of the present application and to the mixture is added 148 g. of xylene as supplementary thinner for the alkyd resin, 3.6 g. of 2-amino-2-methylpropanol as volatile neutralizing agent, and 1.8 g. of a 40% by weight solution of p-toluenesulfonic acid in isopropanol as acid catalyst.

The mixture is shaken until uniform (about 10 minutes). The resulting enamel is then drawn down as a 0.9 mil film on a primed steel panel (Bonderite 100 steel, manufactured by Parker Rustproof Co., Detroit, Mich.) and is baked at 150°C. for 20 minutes. The properties of the resulting film are as follows:

| Test | Result |
|---|---|
| Gloss, 60° | 84% |
| Gloss, 20° | 74% |
| Hardness, pencil | HB-F |
| Hardness, Sward | 22 rocks |
| Hardness, Knoop$_{25}$ | 5.0* |
| Impact resistance, reverse | 50 in. lb. |
| Solvent resistance (to methyl ethyl ketone) | >200 double rubs, with saturated rag |

*Value designates a very hard film.

These results show that the enamel provides a very glossy, very hard, very flexible and very solvent-resistant film when baked at a normal baking temperature.

I claim:

1. A storage-stable substantially non-self-condensing toluene-soluble butylated urea-formaldehyde cross-linking agent of pumpable viscosity at 20°C. and substantially 100% resin solids content, having a weight average molecular weight of less than 1,000, consisting essentially of urea units carrying on the average 0.2 to 0.6 aldehyde-reactive hydrogen atoms per unit and between about:
   0.6 to 1.0 formaldehyde bridge,
   1.2 to 1.8 butoxymethyl substituent and
   0 to 0.2 methylol substituent per urea unit therein.

2. An agent according to claim 1 consisting essentially of urea units carrying on the average 0.3 to 0.5 aldehyde-reactive hydrogen atoms per unit and between about:
   0.7 to 0.9 formaldehyde bridge,
   1.4 to 1.6 butoxymethyl substituent and
   0 to 0.2 methylol substituent per urea unit therein.

3. An agent according to claim 1 having a molecular weight between 600 and 900.

4. An agent according to claim 1 wherein the butoxymethyl substituents are n-butoxymethyl substituents.

5. A cross-linking agent according to claim 1 having a dissolved content of an acid etherification catalyst.

6. A cross-linking agent according to claim 5 wherein the catalyst is nitric acid.

7. Process for the manufacture of a storage-stable toluene-soluble substantially non-self-condensing butylated urea-formaldehyde cross-linking agent according to claim 1, which comprises reacting 1 mol of urea with between about 2.5 and 3.0 mols of formaldehyde in aqueous alkaline solution; forming an aqueous solution of a methylolated urea-formaldehyde condensate; distilling water from said solution until the water content of the solution is less than 15% by weight; adding at least 2 mols of a non-tertiary butanol containing less than 25% by weight of water and a strong water-soluble acid in etherification catalytic amount, thereby forming an acid solution of the reagents; heating said solution and distilling butanol and water from the resulting mixture under vacuum at a temperature below 100°C. thereby rendering said mixture substantially anhydrous, and then distilling water from said solution under a vacuum of at least 25 inches of Hg substantially as fast as said water is formed until the still residue contains between about 1.2 and 1.8 butoxymethyl substituent and less than 0.2 methylol substituent per urea unit therein.

8. A method according to claim 7 wherein the distillation of water from the aqueous solution of the methylolated urea-formaldehyde condensates is performed under a vacuum in excess of 25 inches of mercury and is continued until the water content of the solution is 5% to 10% by weight.

9. A method according to claim 7 wherein at least half of the acid catalyst is added before the butanol.

10. A method according to claim 7 wherein the amount of butanol added is 3 to 4 mols per urea unit present.

11. A method according to claim 7 wherein the butanol is n-butanol.

12. A method according to claim 7 wherein the butanol is isobutanol.

13. A method according to claim 7 wherein the butanol is added as a single increment.

14. A method according to claim 7 wherein the etherification catalyst is nitric acid.

15. A method according to claim 7 wherein no alkanol is added after the butoxymethyl content of the still residue has risen to between about 1.2 and 1.8 mol per urea residue therein, and said distillation is continued until the alkanol content of the still residue is less than 5% by weight.

16. A method according to claim 7 wherein the butanol is added in two portions, the first portion being 2 to 4 mols of aqueous butanol per urea unit present, the water content of said portion being 5% to 25% by weight, and the second portion being 1 to 3 mols of substantially anhydrous butanol, said second portion being added when the still bottom has substantially no content of water.

17. A process according to claim 7 wherein substantially all the added butanol is substantially anhydrous.

18. A process according to claim 17 wherein the amount of added butanol is 3 to 5 mols per urea unit present.

* * * * *